United States Patent [19]

Subramaniam

[11] 4,364,364
[45] Dec. 21, 1982

[54] AIR-FUEL RATIO CONTROLLER

[75] Inventor: Anand Subramaniam, Springfield, Ohio

[73] Assignee: Cooper Industries, Inc., Houston, Tex.

[21] Appl. No.: 286,268

[22] Filed: Jul. 23, 1981

[51] Int. Cl.³ .......................................... F02M 51/02
[52] U.S. Cl. .................................... 123/527; 123/440
[58] Field of Search ....................... 123/527, 440, 489

[56] References Cited

U.S. PATENT DOCUMENTS

| | | | |
|---|---|---|---|
| 4,046,120 | 9/1977 | Laprade et al. | 123/527 X |
| 4,102,313 | 7/1978 | Laprade et al. | 123/440 |
| 4,188,919 | 2/1980 | Bruce | 123/527 X |
| 4,294,214 | 10/1981 | Treible et al. | 123/440 X |

Primary Examiner—Tony M. Argenbright
Attorney, Agent, or Firm—Wilson, Fraser, Barker & Clemens

[57] ABSTRACT

An air-fuel ratio controller adjusts the pressure of gaseous hydrocarbon fuel delivered to an internal combustion engine in order to minimize the emission of undesirable gases, specifically carbon monoxide and oxides of nitrogen. The controller includes a zirconium oxide sensor exposed to the engine exhaust gases, a thermocouple temperature sensor, an electronic signal conditioner which provides a linearized ramp signal, adjustable threshold trigger circuits which fire relays at specific ramp signal values and provide fail-safe operation, electropneumatic valves which respond to the relays and provide a fluid control signal, suitable adjustable flow restrictions and a gas pressure regulator which responds to the fluid control signal and regulates the pressure and thus the flow of gas to the internal combustion engine. Changes in the oxygen content of the exhaust gas are sensed by the zirconium oxide sensor and this change causes the electric valves to pressurize or depressurize the gas pressure regulator diaphragm causing an increase or decrease in the pressure of the gas delivered to the engine thus driving the exhaust gas oxygen level toward the desired value.

17 Claims, 3 Drawing Figures

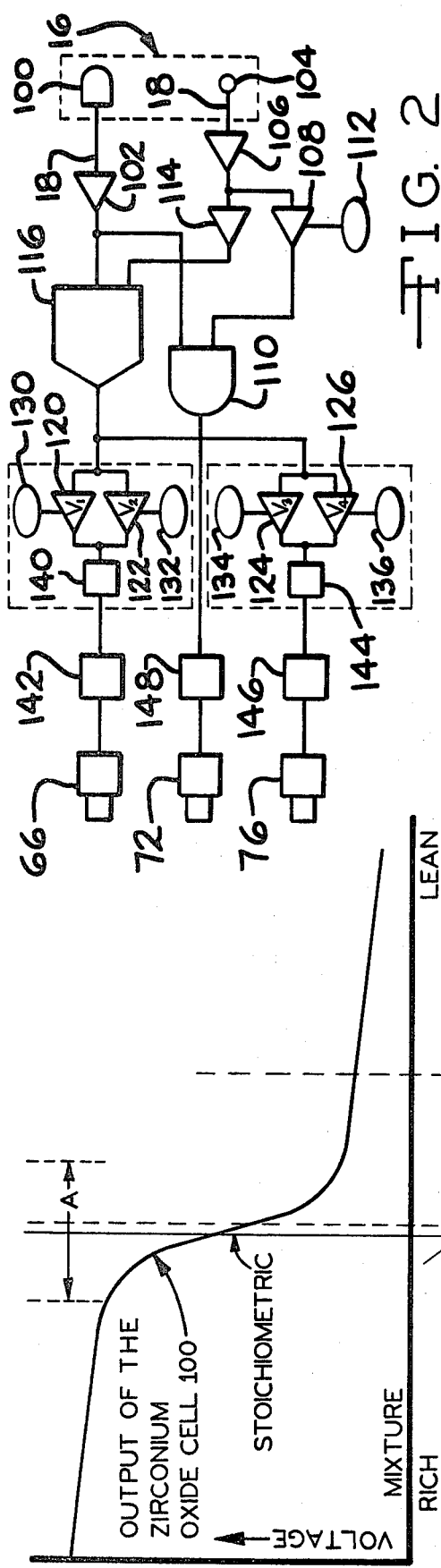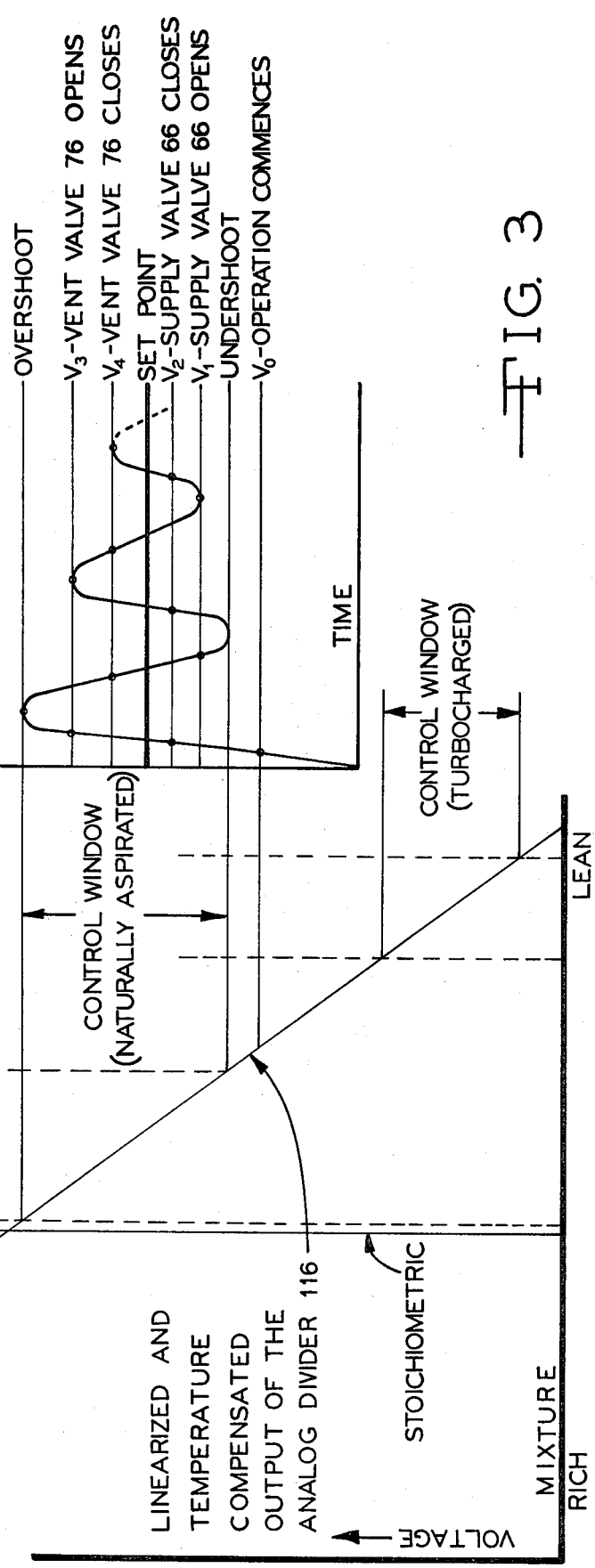
FIG. 2
FIG. 3

AIR-FUEL RATIO CONTROLLER

BACKGROUND OF THE INVENTION

The invention relates generally to internal combustion engine controls and more specifically to a control for adjusting the air-fuel ratio of the mixture supplied to the engine by adjusting the pressure of gaseous fuel delivered to the engine carburetor.

The use of the zirconium oxide sensor to sense a quantity of oxygen in the exhaust gases of an internal combustion engine is well known. Since the quantity of oxygen in the exhaust is related to the ratio of air to fuel in the combustion mixture, such a sensor can be utilized to provide a signal representative of this ratio.

In view of the rather recent and increasing emphasis on reducing pollutants from internal combustion engines, especially those in motor vehicles, design of air-fuel ratio controllers employing such sensors is an active area of technology. U.S. Pat. Nos. 2,389,797, 3,738,341 and 3,815,561 describe several such control systems.

Frequently such systems utilize what may be characterized as an analog or proportional control scheme whereby the exhaust gas oxygen level is determined and a servocontrol mechanism adjusts either the air supply, the fuel supply or both supplies to the engine in order to re-establish operation at or near the control set point. Those familiar with automatic control theory will appreciate that operation of such a system exactly at set point, i.e., with no error signal, is, in fact, not the result of the control system at all but is rather the result of external forces at work which balance the system separate and apart from the servo loop mechanism. Approached from another viewpoint, existence of a finite error signal in a proportional control system resulting from operation away from the set point is necessary in order to commence operation of the mechanism which will attempt to rebalance the system.

The problem has not gone unobserved and numerous control systems employing time based corrective features are known. Such thinking has been applied to the air-fuel ratio controller disclosed in U.S. Pat. No. 4,019,474 and other patents. While these devices exhibit apparently improved control characteristics, the increased complexity results in higher cost and less reliable operation. These deficiencies suggest and encourage the investigation and application of alternate control theories.

One alternate control theory comprehends the use of two position control. As those familiar with zirconium oxide oxygen sensors will appreciate, such sensors exhibit a marked change in output as the constitutents of an air-fuel mixture deviate from stoichiometric. This significant, almost discontinuous, change in the output renders control at the stoichiometric ratio straightforward since small deviations from stoichiometric result in substantial output changes. Aside from the disadvantage of equipment cycling, this arrangement effects accurate operation at the stoichiometric mixture inasmuch as considerations of error signal and operation offset from the set point are negligible. If, however, it is desirable to provide air-fuel mixtures and operate an engine under conditions which vary significantly from stoichiometric, difficulties arise since the change in output voltage of the sensor per unit change of the air-fuel ratio, i.e., the slope of the voltage/air-fuel ratio line decreases as the air-fuel ratio diverges from stoichiometric. Operation of a two position control at air-fuel ratios differing greatly from stoichiometric mixtures may therefore prove difficult due to the small signal variation and hysteresis of the overall system.

SUMMARY OF THE INVENTION

The instant invention comprehends an air-fuel ratio controller suitable for use with internal combustion engines which utilize a gaseous fuel. The controller adjusts the pressure and thus the flow rate of fuel supplied to the carburetor of the engine in order to maintain a given air-fuel ratio notwithstanding fluctuations in other operating parameters such as speed, load, air temperature, humidity, etc.

The controller includes a zirconium oxide sensor exposed to the exhaust gases of the internal combustion engine which provides a voltage output which varies non-linearly with respect to a change in the air-fuel ratio. The signal is linearized by a complementary non-linear buffer amplifier and this linear signal is utilized to drive voltage triggers having adjustable hysteresis which cycle electric valves. The valves control the supply and exhaust of a control fluid, typically gas, to and from the diaphragm of a control regulator which correspondingly increases or decreases the pressure and thus the flow of gaseous fuel to the carburetor of a gaseous fuel internal combustion engine. Deviations from a given oxygen content in the exhaust are indicative of deviations in the air-fuel ratio and actuate the electric valves to increase or decrease the gas supply pressure in order to drive the air-fuel ratio toward the set point. Adjustable flow restrictions in the control line between the electric valves and the diaphragm of the regulator permit selection and adjustment of the time constant of the corrective action.

It is thus an object of the instant invention to provide an air-fuel ratio controller for adjusting the pressure of a gaseous fuel delivered to an internal combustion engine.

It is a still further object of the instant invention to provide an air-fuel ratio controller which utilizes gaseous fuel in the control and pressure regulation system.

It is a still further object of the instant invention to provide an air-fuel ratio control system employing floating control with a variable dead band and variable hysteresis.

Further objects and advantages of the invention will become apparent by reference to the following description and appended drawings.

BRIEF DESCRIPTION OF THE DRAWINGS

FIG. 2 is a schematic block diagram of the electronic signal conditioning and relay drive circuit of an air-fuel ratio controller according to the instant invention; and FIG. 3 is a composite graph which relates air-fuel ratio, oxygen sensor output, linearized oxygen sensor signal, control relay output senquencing and damped air-fuel ratio control afforded by the instant invention.

DESCRIPTION OF THE PREFERRED EMBODIMENT

Figure 1:
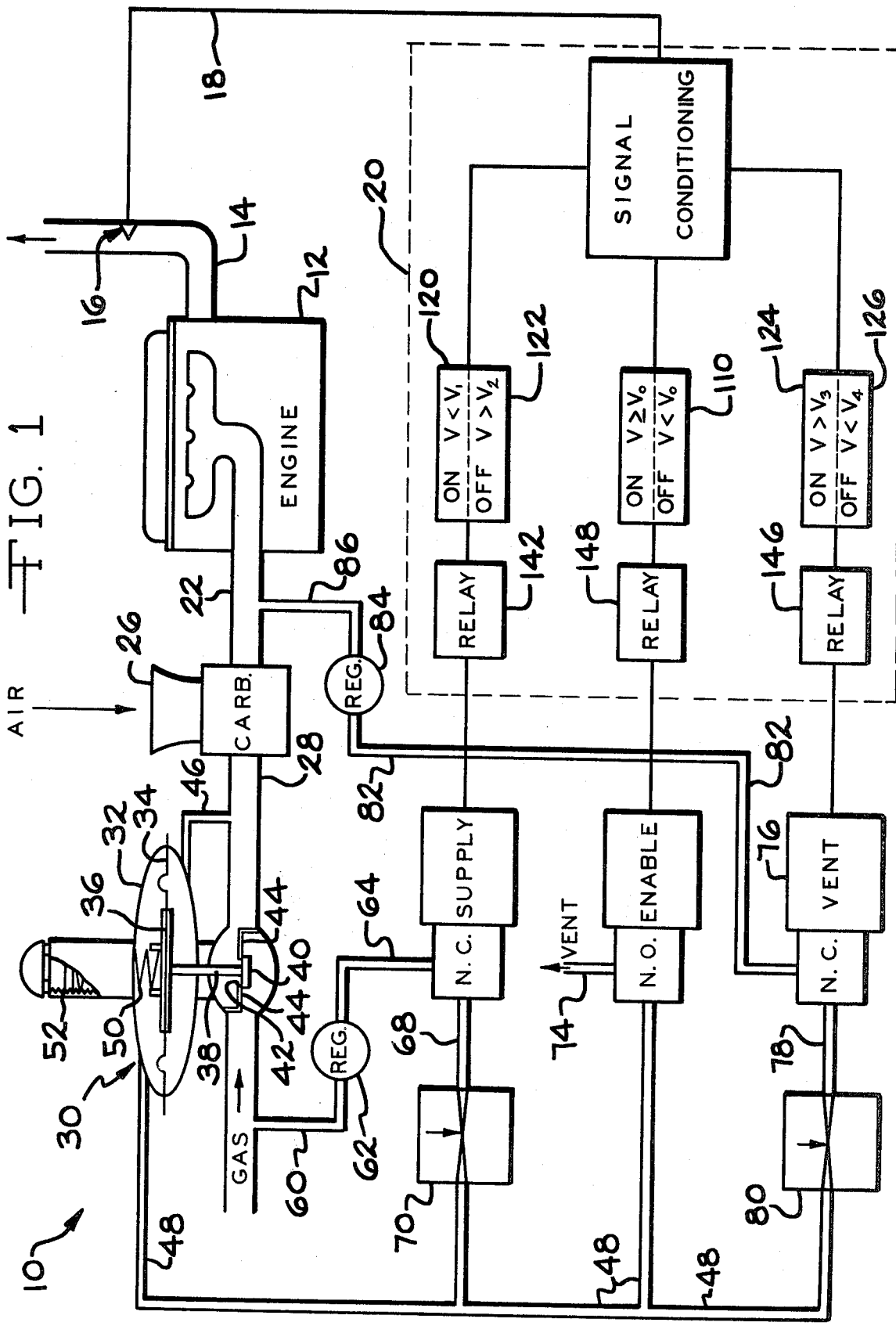
FIG. 1 is a diagrammatic view of an air-fuel ratio control system according to the instant invention.

Referring now to FIG. 1, a prime mover internal combustion engine incorporating an air-fuel ratio control system according to the instant invention is generally designated by the reference numeral 10. The system 10 operates with a substantially conventional naturally aspirated natural gas internal combustion engine 12 which includes the conventional complement of reciprocating pistons, cylinders, a crank shaft, etc., which are not illustrated. The engine 12 also includes an exhaust manifold 14 having a zirconium oxide sensor assembly 16 disposed therein. The zirconium oxide sensor assembly 16 provides two electrical signals which are carried in a four conductor signal cable 18 to the electronic circuitry 20. The engine 12 also includes an intake manifold 22 which provides an air-fuel mixture supplied by a carburetor 24 to the cylinders of the engine 12. The carburetor 24 is likewise conventional, and receives atmospheric air through a throat 26 and is supplied with gaseous fuel such as natural gas, propane or butane at a controlled pressure through a supply line 28. A servoregulator assembly 30 controls the pressure of the gaseous fuel flowing in the supply line 28 and supplied to the carburetor 24. The servoregulator assembly 30 includes a sealed, typically circular housing 32 having a diaphragm 34 disposed therein generally coincident with the horizontal mid-plane of the housing 32. The diaphragm 34 may include strengthening ribs or plates 36 disposed generally in its center to which an elongated control rod 38 is secured. At the end of the control rod 38 opposite the diaphragm 34 and reinforcing plate 36 is a valve disc 40 which is typically circular and which selectively opens and closes an aperture 42 defined by a valve seat structure 44. The partial opening and closing of the aperture 42 throttles the flow of gas through the servoregulator assembly 30 and, therefore, controls the pressure of the gaseous fuel delivered to the carburetor 24. The servoregulator assembly 30 also includes a feedback passageway 46 which communicates between the interior portion of the housing 32 below the diaphragm 34 and the supply line 28. A control line 48 provides communication to the interior portion of the housing 32 above the diaphragm 34. Finally, the servoregulator assembly 30 includes a compression spring 50 which is disposed between the central plate 36 of the diaphragm 34 in a conventional threaded adjustment stack 52. The compression spring 50 provides an adjustable biasing force which, if unopposed, moves the valve disc 40 away from the valve seat members 44 and opens the aperture 42.

A passageway 60 also provides gaseous fuel to a fixed pressure regulator 62. The outlet of the fixed pressure regulator 62 is connected through a control line 64 to one port of a normally closed electropneumatic supply valve 66. The other port of the normally closed electropneumatic valve 66 is connected through a control line 68 to a variable restriction device 70. The outlet of the variable restriction device 70 is connected to the control line 48. The variable restriction device 70 preferably includes an orifice having a range of adjustability of from approximately zero to 0.1 square inches in area. Parameters affecting the choice of orifice size as well as the effect of orifice size on the operation of the system 10 will be addressed subsequently.

The control line 48 also communicates with one port of a normally open electropneumatic enable valve 72. The other port of the normally open electropneumatic valve 72 is vented to the atmosphere by a vent line 74. The control line 48 also communicates with another variable restriction device 80 which is in turn connected through a control line 78 to one port of a normally closed electropneumatic vent valve 76. The variable restriction device 80 and the preferred range of orifice size adjustability is identical to that of the variable restriction device 70, and its operation, likewise, will be discussed subsequently. The other port of the normally closed electropneumatic valve 76 is connected through a control line 82 to a vacuum regulator 84. The vacuum regulator in turn communicates with a source of vacuum such as the intake manifold 22 through a line 86.

Referring now to FIG. 1 and especially to FIG. 2, the zirconium oxide sensor assembly 16 includes a zirconium oxide cell 100 having a low voltage output which is electrically connected by the signal cable 18 to a voltage amplifier 102 in the electronic circuitry 20. The zirconium oxide cell 100 is conventional and will preferably include a partition of zirconium oxide having a permeable metallic layer of, for example, platinum, deposited on both faces of the partition. When exposed on one side to a reference concentration of oxygen such as contained in the atmosphere and on the other side to the oxygen contained in the exhaust manifold 14, the zirconium oxide cell 100 generates a low voltage electrical signal. Below approximately 650° C., the zirconium oxide cell 100 loses its sensitivity and above 1600° C., the deposited platinum may be destroyed. Within the operating range generally defined by these limits, the output of the zirconium oxide cell 100 is temperature related and therefore compensation must be made in order to obtain a meaningful reading.

Compensation is achieved by sensing the temperature of the zirconium oxide sensor assembly 16 with a thermocouple 104 which is disposed in close proximity to the zirconium oxide cell 100 and which provides a low voltage output representative of its temperature. The output of the thermocouple 104 is likewise carried by the signal cable 18 to a compensating amplifier 106 which provides a linear signal representative of the temperature of the cell 100. This linear signal is provided to a comparator 108. The comparator 108 provides a binary GO-NOGO signal to a dual input AND gate 110 providing a NOGO signal when the voltage supplied to it is below a threshold level set by a threshold control 112 indicating that either the thermocouple 104 and thus the zirconium oxide sensor assembly 16 generally has not achieved a given minimum threshold temperature or that the thermocouple 104 has failed. Conversely, a GO signal is provided to the dual input AND gate 110 when the thermocouple 104 is operating properly in the appropriate temperature range. The output of the compensated amplifier 106 is also fed to the bias circuit 114 which scales the temperature signal from the thermocouple 104 for supply to an analog divider 116. The output of the zirconium cell amplifier 102 is likewise supplied to the dual input AND gate 110 and the analog divider 116.

Such a temperature compensation configuration assumes, of course, that the temperature of the exhaust gases in the exhaust manifold 14 is sufficient to heat the zirconium oxide sensor assembly 16 to a temperature within the previously stated operating range. Installations utilizing gases having low heat content such as landfill and wood gas may have exhaust temperatures below the minimum operating temperature of the zirconium oxide cell 100. In these instances, the zirconium oxide cell 100 may be placed in a temperature controlled oven (not illustrated) within which the temperature is maintained at, for example, 1500° Fahrenheit and exposed, as described, to the exhaust gases. Disposed in this fashion, there is no need for temperature compensation of the output of the zirconium oxide cell 100 provided by the compensation amplifier 106.

The analog divider 116 provides a temperature compensated ramp signal which represents the percent of oxygen in the exhaust gases within the manifold 14. The output of the analog divider 116 is fed to a first pair of comparators 120 and 122 and a second pair of comparators 124 and 126. Each of the comparators 122, 124, 126 and 128 includes an associated threshold control 130, 132, 134 and 136, respectively. The threshold controls 130, 132, 134 and 136 permit adjustment of the switch point of the comparators 122 through 128 and provide variable hysteresis operation of the system 10 in a manner to be described subsequently. The outputs of the first pair of comparators 120 and 122 drives a flip-flop memory circuit 140 which in turn provides power to a solid state relay 142 capable of controlling sufficient electrical energy to activate the normally closed supply valve 66. Similarly, the output of the second pair of comparators 124 and 126 drives a flip-flop memory circuit 144 which in turn drives a solid state relay 146 capable of controlling sufficient electrical energy to activate the normally closed vent valve 76. Similarly, the output of the dual input AND gate 110 drives a solid state relay 148 capable of controlling sufficient electrical energy to activate the normally open enable valve 72.

The electronic circuitry 20 just described, namely, the voltage amplifier 102 through the solid state relay 148, inclusive, are available as a commercial, packaged assembly. For example, the Model No. 8541-111-00 manufactured by Cleveland Controls, Inc., Cleveland, Ohio, or similar units may be utilized to provide control voltages to the electropneumatic valves 66, 72 and 76. In view of this fact, these components will not be described in greater detail.

Referring now especially to FIG. 3 as well as the other drawing figures, the operation of the air-fuel ratio control system 10 will be described. In the upper left portion of FIG. 3, a graph depicts the significantly non-linear output of the zirconium oxide cell 100 and the manner in which its output varies as the exhaust constituents to which it is exposed vary from a rich mixture, through stoichiometric, to lean. As has been previously noted, the output of the zirconium oxide cell 100 is also temperature sensitive and this sensitivity must be and is compensated by the thermocouple 104 and associated circuitry (illustrated in FIG. 2) to provide a linear ramp signal illustrated by the diagonal line in the lower left portion of FIG. 3. It is this ramp signal which is utilized to drive the comparators 120, 122, 124 and 126 which ultimately control the operation of the normally closed, electropneumatic supply valve 66 and the normally closed electropneumatic vent valve 76.

Initially, the internal combustion engine 12 which the system 10 is to control is adjusted to run lean, that is, to ingest more air than is necessary to fully burn the fuel. This adjustment is customarily done in the production line and is achieved by adjusting the components of the carburetor 24 and/or the compression spring 50 disposed within the servoregulator assembly 30. The internal combustion engine 12 will thus operate in the region on the right side of the two graphs of FIG. 3 discussed above. It should be noted that lean base line operation is beneficial from a failure mode standpoint inasmuch as failure and/or inactivity of the system 10 will result in said lean operation which has generally been found to be preferable to rich operation which suffers from both poor fuel efficiency and the production of excessive quantities of unburned hydrocarbons and carbon monoxide in the exhaust of the engine 12.

When the system 10 is in a totally deactivated condition, the normally closed electropneumatic supply valve 66, the normally open electropneumatic enable valve 72 and the normally closed electropneumatic vent valve 76 are in their de-energized, normal positions. Thus, the upper portion of the servoregulator assembly 30, above the diaphragm 34, is vented to the atmosphere through the control line 48, the normally open enable valve 72 and the vent line 74. The servoregulator assembly 30 will thus function as a substantially conventional regulator, providing, as previously noted, a lean fuel supply to the engine 12.

Assuming the engine 12 has been started and is operating, the temperature of both the zirconium oxide cell 100 and of the thermocouple 104 will rise. There will be no meaningful output from the analog divider 116 until the output of the thermocouple 104 indicates that the zirconium oxide sensor assembly 16 (and the cell 100) has reached a minimum operating temperature. During this interval, however, the voltage sensed by the comparator 120 is below the $V_1$ threshold illustrated on the right graph of FIG. 3 and thus the solid state relay 142 is activated which in turn energizes the normally closed supply valve 66. In the open position, the supply valve 66 provides a flow of the control fluid, namely, the gas supplied to the internal combustion engine 12, from the fixed pressure regulator 62, through the variable restriction device 70 and into the control line 48. At this time, the control line 48 is still vented to atmosphere, so no control activity takes place.

At the $V_0$ threshold, the AND gate 110 activates the solid state relay 148 which in turn energizes the normally open enable valve 72. With the enable valve 72 closed, the control line 48 is no longer vented to atmosphere and pressure above the diaphragm 34 of the servoregulator assembly 30 begins to increase, opening the aperture 42 and increasing the pressure of the gas delivered to the carburetor 24. The rate of pressure increase is primarily controlled by the variable restriction device 70 disposed between the control lines 48 and 68. As the pressure of the gaseous fuel supplied to the engine 12 increases, the mixture will become richer. A corresponding decrease in the oxygen content of the gases in the exhaust manifold 14 will be sensed by the zirconium oxide cell 100 and its output will increase. The operating condition of the engine 12 has moved to the left of the graphs of FIG. 3, toward stoichiometric.

As the linearized and temperature compensated output of the analog divider 116 increases to $V_2$ in the graph on the right of FIG. 3, the normally closed supply valve 66 is de-energized. The pressure of the gaseous fuel supplied to the carburetor 24 is now fixed. Until the ramp signal from the analog divider 116 falls below the $V_1$ threshold or rises above the $V_3$ threshold, no further activity of the system 10 will occur.

Typically, however, on the first cycle of operation, the control system 10 will overshoot and provide an overly rich air-fuel mixture to the internal combustion engine 12. Such overshoot is generally indicated by the decaying sinusoidal curve in FIG. 3. As the exhaust gas oxygen content of the engine 12 sensed by the zirconium oxide cell 100 lowers, the output voltage of the analog divider 116 increases above the value corresponding to the setpoint air-fuel ratio and eventually increases above $V_3$, the threshold of the comparator 124. When the $V_3$ threshold is exceeded, the solid state relay 146 is activated and energizes the normally closed electropneumatic vent valve 76. In this operating state, the gas above the diaphragm 34 in the servoregulator assembly 30 is withdrawn through the variable restriction device 80, the vacuum regulator 84 and into the engine 12. Lowering of the pressure against the diaphragm 34 of the servoregulator assembly 30 gradually closes the aperture 42, lowering the pressure of the gaseous fuel delivered to the carburetor 24 and thereby shifting the air-fuel mixture ratio of the engine 12 to the right, away from stoichiometric. As this change in the air-fuel ratio is sensed by the zirconium oxide cell 100, the output voltage of the analog divider 116 drops and at $V_4$, the comparator 126 deactivates the solid state relay 146, de-energizing the normally closed vent valve 76 and terminating the release of gas from above the diaphragm 34 of the servoregulator assembly 30.

As the sinusoidal graph of FIG. 3 suggests, this cycle of operation, beginning with the opening of the supply valve 66 will then repeat itself. Depending upon the time constant associated with the internal combustion engine 12 and that of the control system 10, particularly due to the variable restriction devices 70 and 80, the control system 10 will continue to seek the control setpoint, exhibiting significantly reduced overshoot and understood during every subsequent cycle. After several cycles of operation, the control system 10 will determine the proper pressure to be applied to the diaphragm 34 of the servoregulator assembly 30 in order to maintain a desired air-fuel ratio. In this operating condition, both the supply valve 66 and the vent valve 76 are de-energized and the servoregulator assembly 30 will provide constant pressure delivery of gaseous fuel to the carburetor 24, over a range of gas supply pressures, much as a conventional regulator operates. In the absence of leaks, changes in ambient conditions, load conditions, fuel composition, etc., the control system 10 will stabilize in this operational mode.

Any disturbance that causes the air-fuel ratio sensed by the zirconium oxide cell 100 to increase, and thus the output voltage of the analog divider 116 to decrease below $V_1$, the voltage threshold of the comparator 120, will initiate an appropriate increase in the pressure against the top of the diaphragm 34 of the servoregulator assembly 30 and a corresponding increase in the richness of the air-fuel mixture delivered to the engine 12. Conversely, an increase in the voltage output of the divider 116 above $V_3$, the voltage threshold of the comparator 124, will initiate a corresponding decrease in the richness of the mixture delivered to the engine 12. A new operating point will thus be achieved which compensates for the disturbance and the air-fuel ratio will again return to its desired value.

It should be noted that the various graphs of FIG. 3 are to be construed as explanatory and qualitative rather than limiting and quantitive. For example, it should be understood that the slope of the line representing the output of the analog divider 116 may be readily altered by increasing the gain of the amplifiers in the electronic circuitry 20, thus apparently improving the sensitivity and accuracy with which the system 10 may control the air-fuel ratio of the engine 12. Furthermore, and as noted in the specification above, the voltage thresholds $V_1$, $V_2$, $V_3$ and $V_4$ of the comparators 120, 122, 124 and 126, respectively are adjustable; a feature which likewise permits adjustment of the overall operating sensitivity of the system 10. It should therefore be apparent that the voltage range between $V_1$ and $V_2$ which cycles the supply valve 66 and $V_3$ and $V_4$ which cycles the vent valve 76 may be reduced to negligible values which provide exceedingly accurate control.

A further consideration related to the overall time constant of the system 10 concerns the magnitudes of the pressure and vacuum provided by the pressure regulator 62 and the vacuum regulator 84, respectively, as well as the settings of the variable restriction devices 70 and 80. Due to the response time of a typical large, stationary internal combustion engine, it has been found preferable to provide a slow, controlled rate of change of the delivered air-fuel ratio. Typically, five to twenty seconds elapses as the system 10 cycles from the leanest delivered mixture to the richest, fifteen seconds being a preferable value. Such cyclic operation is graphically illustrated in the right portion of FIG. 3. In order to provide such an operating time constant, the fixed pressure regulator 62 is preferably set to provide a pressure of approximately five inches of water column and the vacuum regulator 84 is set to provide a vacuum of approximately three inches of water column. The variable restriction devices 70 and 80 are preferably adjusted to provide orifices of approximately 0.05 square inches in area as previously noted. By utilizing these devices the relatively rapid response time of the system 10 is slowed to match the slower response time of the engine 12, thereby eliminating excessive overshoot, undershoot, and cycling and providing appropriately damped operation.

Such operation is achieved by cooperation between these devices. The pressure regulator 62 and vacuum regulator 84 provide finite limits to the pressure or vacuum, respectively, applied to the diaphragm 34 of the servoregulator assembly 30. The variable restriction devices 70 and 80 then provide a means of adjusting the rate at which the pressure or vacuum applied to the servoregulator assembly 30 changes. Obviously, a change in the pressure or vacuum settings of the regulators 62 and 84 will effect a corresponding change in the flow and thus the rate of change per unit time of the pressure or vacuum within the servoregulator assembly 30. Thus, while interrelated in operation, both the pressure and vacuum limits provided by the pressure regulator 62 and the vacuum regulator 84, respectively, and the flow rate adjustments provided by the variable restriction devices 70 and 80 are preferred in order to provide optimum operation of the system 10.

A final consideration regarding response time relates to the normally open electropneumatic valve 72 and the control line 48 connecting it to the servoregulator assembly 30. As has been previously explained, the valve 72 closes to enable the system, i.e., place the system 10 in a controlling mode, and opens to vent the servoregulator assembly 30 when the system 10 has been deactivated or when a failure of, for example, the zirconium oxide sensor assembly 16 or electronic circuitry 20 has occurred. At this time, it is preferable to rapidly vent the volume of gas disposed above the diaphragm 34 within the housing 32 of the servoregulator assembly 30. Two approaches render this venting most expeditious. First of all, the normally open electropneumatic valve 72 may be physically mounted on or adjacent the servoregulator assembly 30. As an alternative or in combination with this approach, the size of the control line 48 interconnecting the servoregulator assembly 30 and the normally open electropneumatic valve 72 may be of a larger diameter than the remaining portions of the control line 48 such that flow therethrough may be maximized.

Finally, referring again briefly to FIG. 3, it should be noted that the system 10 is adaptable to air-fuel ratio control of either a naturally aspirated or turbocharged internal combustion engine. The control window for a naturally aspirated internal combustion engine represents a portion of the graph of the output of the analog divider 116 which is wholly within the lean region of a mixture graph but generally adjacent the line representing a stoichiometric mixture, as illustrated. By way of digression, it may be noted that typical automotive air-fuel ratio control systems operate over a control window substantially uniformly divided by the stoichiometric line of a mixture graph. (Designated A) In turbocharged internal combustion engines which utilize significant amounts of excess air, the overall operating conditions, and thus, the control window are shifted to the right to the region designated in FIG. 3. By suitably scaling the output of the analog divider 116 and appropriately adjusting the threshold controls 130, 132, 134 and 136, operation at this preferred turbocharged engine control window may be simply and readily achieved.

The foregoing disclosure is the best mode devised by the inventor for practicing this invention. It is apparent, however, that devices incorporating modifications and variations to the instant invention will become obvious to one skilled in the art of air/fuel mixture controls. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. An air-fuel control system for a gaseous fuel internal combustion engine having a carburetor and an exhaust manifold comprising, in combination, means for sensing the oxygen content in the gases in said exhaust manifold, means for providing a temperature compensated electrical signal representative of said sensed oxygen content, a pressure regulator means for controlling the pressure of such gaseous fuel supplied to such carburetor, said regulator means including a housing, a diaphragm disposed within said housing and defining an upper and a lower chamber above and below said diaphragm, respectively, said lower chamber communicating with such gaseous fuel supplied to such carburetor, a first control valve communicating between such gaseous fuel supplied to said pressure regulator and said upper chamber of said regulator means, means for opening said first valve in response to an increase in the oxygen content of such gases in such exhaust manifold, and a second control valve communicating between said upper chamber of said regulator means and a source of pressure below the pressure of such gas supplied to said pressure regulator and means for opening said second valve in response to a decrease in the oxygen content of such gases in such exhaust manifold.

2. The air-fuel ratio control system of claim 1 wherein said means for opening said first valve includes means for closing said first valve in response to a decrease in the oxygen content of such gases in such exhaust manifold and said means for opening said second valve includes means for closing said second valve in response to an increase in the oxygen content of such gases in such exhaust manifold.

3. The air-fuel ratio control system of claim 1 further including a first restriction device disposed between said first control valve and said upper chamber of said regulator and a second restriction device disposed between said second control valve and said upper chamber of said regulator.

4. The air-fuel ratio control system of claim 1 further including pressure regulator means providing communication between said gaseous fuel supplied to said carburetor and said first control valve for controlling the maximum pressure of such gaseous fuel delivered to said first control valve.

5. The air-fuel ratio control system of claim 1 further including means for adjusting the oxygen content value at which said opening means opens said valves.

6. The air-fuel ratio control system of claim 2 further including means for adjusting the oxygen content value at which said opening and closing means open and close, respectively, said valves.

7. The air-fuel ratio control system of claim 1 further including a third control valve communicating between said upper chamber of said regulator means and the atmosphere and means for closing said third control valve when said system is activated and said temperature sensing means is above a predetermined temperature.

8. An air-fuel control system for a gaseous fuel internal combustion engine having a carburetor and intake manifold, and an exhaust manifold comprising, in combination, means for sensing the oxygen content in the gases in said exhaust manifold, means for sensing the temperature of said just recited means, means for providing a temperature compensated electrical signal representative of said sensed oxygen content, a pressure regulator means for controlling the pressure of such gaseous fuel supplied to such carburetor, said regulator means including a housing, a diaphragm disposed within said housing and defining an upper and a lower chamber above and below said diaphragm, respectively, said lower chamber communicating with such gaseous fuel supplied to such carburetor, a first control valve and restricting orifice connected serially and communicating between such gaseous fuel supplied to such carburetor and said upper chamber of said regulator means, means for opening said first valve in response to such sensed oxygen content in such gases in such exhaust manifold exceeding a predetermined first level and for closing said first valve in response to such sensed oxygen content in such gases in such exhaust manifold dropping below a predetermined second level, a second control valve and restricting orifice connected serially and communicating between said upper chamber of said regulator means and a source of pressure below the pressure of such gaseous fuel supplied to said carburetor and means for opening said second valve in response to such sensed oxygen content in such gases in such exhaust manifold dropping below a predetermined third level and for closing said second valve in response to such sensed oxygen content in such gases in such manifold exceeding a predetermined fourth level.

9. The air-fuel control system of claim 8 wherein said first level corresponds to the highest level oxygen content in such gases in such exhaust manifold, said third level corresponds to the lowest level oxygen content in such gases in such exhaust manifold and said second and said fourth levels correspond to higher and lower intermediate levels, respectively.

10. The air-fuel control system of claim 8 wherein said predetermined levels of oxygen causing valve opening and closing are independently adjustable.

11. The air-fuel control system of claim 8 and further including a third control valve communicating between said upper chamber of said regulator means and the atmosphere and means for closing said third control valve when said system is activated and said temperature sensing means is above a predetermined temperature.

12. The air-fuel control system of claim 8 further including a pressure regulator providing communication between said gaseous fuel supplied to said carburetor and said first control valve for controlling the maximum pressure of such gaseous fuel delivered to said first control valve.

13. The air-fuel control system of claim 8 wherein said source of pressure below the pressure of such gaseous fuel supplied to said carburetor is such intake manifold.

14. The air-fuel control system of claim 13 further including a vacuum regulator providing communication between such intake manifold and said second normally closed control valve.

15. An air-fuel control system for a gaseous fuel internal combustion engine having a carburetor, an intake manifold and an exhaust manifold comprising, in combination, means for sensing the oxygen content in the gases in said exhaust manifold, means for sensing the temperature of said just recited means, means for providing a temperature compensated electrical signal representative of said sensed oxygen content, a pressure regulator means for controlling the pressure of such gaseous fuel supplied to such carburetor, said regulator means including a housing, a diaphragm disposed within said housing and defining an upper and a lower chamber above and below said diaphragm, respectively, said lower chamber communicating with such gaseous fuel supplied to such carburetor, a first normally closed valve, a pressure regulator providing communication between such gaseous fuel supplied to such carburetor and said first normally closed valve, a restricting orifice providing communication between said first normally closed valve and said upper chamber of said regulator means, a second normally closed valve, a vacuum regulator providing communication between said intake manifold and said second normally closed valve, a restricting orifice providing communication between said second normally closed valve and said upper chamber of said regulator means, a normally open valve communicating between said upper chamber of said regulator means and the atmosphere, means for closing said normally open valve when said temperature sensing means is above a predetermined temperature, means for opening said first normally closed valve in response to such sensed oxygen content in such gases in such exhaust manifold exceeding a predetermined first level and for closing said first normally closed valve in response to such sensed oxygen content in such gases in such exhaust manifold dropping below a predetermined second level, means for opening said second normally closed valve in response to such sensed oxygen content in such gases in such exhaust manifold dropping below a predetermined third level and for closing said second normally closed valve in response to such sensed oxygen content in such gases in such manifold exceeding a predetermined fourth level.

16. The air-fuel control system of claim 15 wherein said first level corresponds to the highest level oxygen content in such gases in such exhaust manifold, said third level corresponds to the lowest level oxygen content in such gases in such exhaust manifold and said second and said fourth levels correspond to higher and lower intermediate levels, respectively.

17. The air-fuel control system of claim 15 wherein said predetermined levels of oxygen causing valve opening and closing are independently adjustable.

* * * * *